United States Patent Office 3,394,006
Patented July 23, 1968

3,394,006
PHOTOGRAPHIC ELEMENT
Fumihiko Nishio, Odawara-shi, Nobuo Yamamoto, Kanagawa-ken, Takaya Ogino, Odawara-shi, and Kikuo Yamagishi, Kanagawa-ken, Japan, assignors to Fuji Shashin Film Kabushiki Kaisha, Kanagawa-ken, Japan
No Drawing. Filed Feb. 24, 1965, Ser. No. 435,053
Claims priority, application Japan, Feb. 25, 1964, 39/9,914
5 Claims. (Cl. 96—87)

The present invention relates to a process for producing photographic films having improved properties, and to a sub-coating layer present between a support and a photosensitive emulsion layer or a back layer in the case of producing a photographic film using a hydrophobic film as the support.

There are various kinds of hydrophobic films, such as, cellulose ester films, polyamide films, polyethylene tetraphthalate films, polycarbonate films, polystyrene films, and polyvinyl chloride films.

An object of this invention is to provide a photographic film having improved adhesive property for photosensitive emulsion layer to a support.

Another object of this invention is to strengthen and secure the adhesive property between the hydrophobic support and a photosensitive emulsion layer of a photographic film.

As resins used for sub-coating layers in the production of photographic films are usually used natural materials, such as, gelatin, glue, and denatured products thereof or hydrophilic synthetic polymer resins each having at least a hydrophilic group, such as OH, —COOH, —SO$_3$H, —NH$_2$, —CONH$_2$, —CONHR, and —CONR$'_2$ (R and R' each represents an alkyl group, an aryl group, etc.). Since these resins are hydrophilic, they are applied on the surfaces of hydrophobic films as the solutions in organic solvents or the dispersions in organic solvents or water, but in order to obtain desired adhesive property, there are some limits in the selection of resins, selection of solvents, coating conditions and the like. Further, when an emulsion layer is applied on a subcoating layer, the emulsion layer is frequently infected with the sub-coating layer.

As the results of various investigations, the inventors have found that the above problems are easily solved by adding a dichloro-s-triazine derivative shown by the general formula

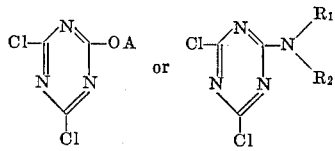

wherein A represents an alkyl group, a cyclic alkyl group, an aryl group, or an aralkyl group and R$_1$ and R$_2$ each represents H, an alkyl group, a cyclic alkyl group, an aralkyl group, or —NHR$_3$ (where R$_3$ is an alkyl group or an aryl group), and when R$_1$ and R$_2$ are alkyl they can be combined to form a ring containing CH$_2$O, S, or N—R$_4$ (where R$_4$ is a lower alkyl group) in the sub-coating layer, the selection of resins for the sub-coating layer can therefore be simplified, and even in the case where good adhesion can not be obtained by conventional methods, the adhesion can be remarkably increased by the addition of such a dichloro-s-triazine.

Further, an important feature of the addition agent in this invention is that when the agent is added in a sub-coating layer, it gives no bad influences on a photosensitive emulsion.

The dichloro-s-triazine derivatives shown by the above general formula, which is incorporated in a sub-coating layer in the process of this invention, is suitably used in an amount of ⅓ to 1/1000 part of the weight of resins in the subcoating layer, but the amount of 1/10 to 1/100 is particularly preferable. Further the dichloro-s-triazine derivative may be used alone or a mixture with other such derivative or derivatives. The examples of such dichloro-s-triazine derivatives are as follows:

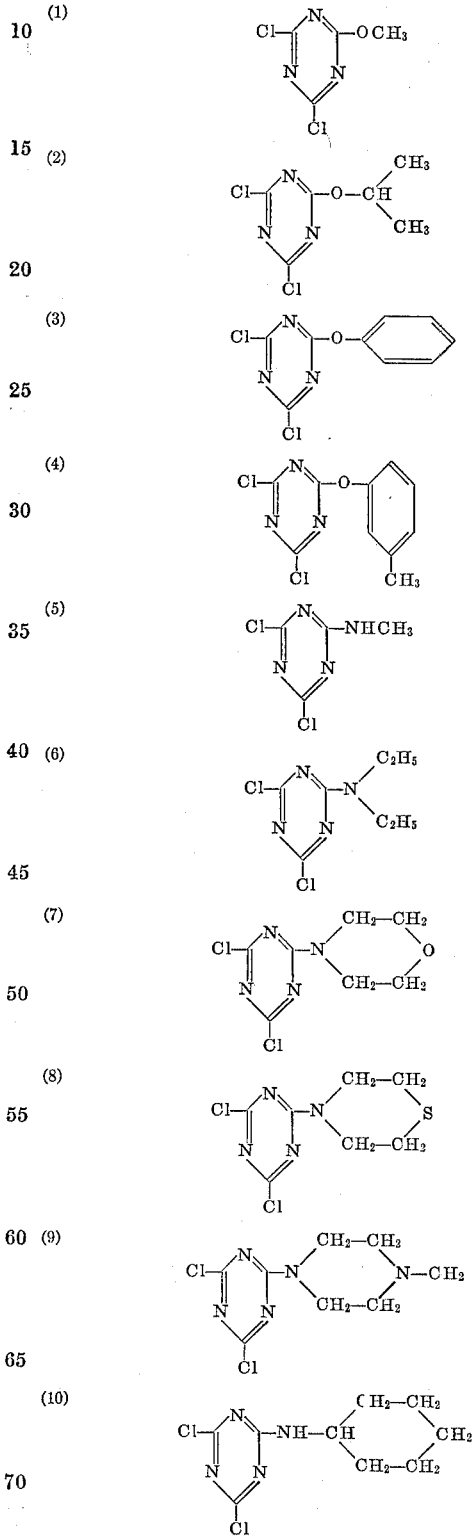

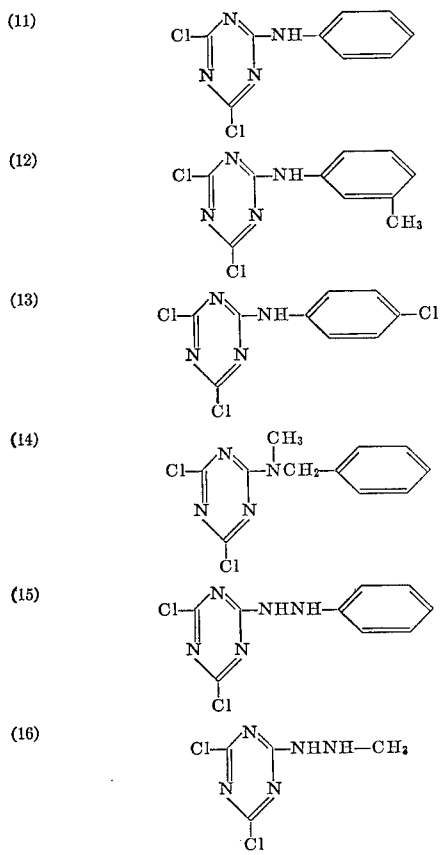

These dichloro-s-triazine derivatives may be prepared by the reaction of cyanuric chloride and corresponding amino compounds or hydroxy compounds in a manner analogous to that described in the Journal of the Society of Organic Synthetic Chemistry, Japan, vol. 18, p. 102 and p. 186 (1960).

The above-mentioned dichloro-s-triazine derivatives are soluble in solvents, such as, alcohols, ketones, esters, or halogenated hydrocarbons and hence by using these derivatives as the solution of such a solvent, they can be added in most solutions of resins in organic solvents. Moreover, they can be added an aqueous solution. The solution containing the above-mentioned dichloro-s-triazine derivatives is substantially stable at room temperature if the solution is not strongly acid.

When a sub-coating solution containing the above-mentioned dichloro-s-triazine derivative is applied on the surface of a hydrophobic film base by a conventional coating method and then an emulsion is applied directly on the surface, even though the adhesion between the film base and the emulsion layer just after coating is insufficient, the adhesion becomes complete after about ten days by the formation of cross linking bonds and the obtained films can be used practically. However, if one more gelatin layer is coated on the sub-coating layer followed by drying sufficiently at about 60° C., the adhesion is further improved. In this case, the above-mentioned dichloro-s-triazine derivative may be added in the gelatin layer and in such case that the dichloro-s-triazine derivative is added in the gelatin layer, the addition of the dichloro-s-triazine derivative in the sub-coating layer under the gelatin layer may be omitted. Further, in the case where triacetyl cellulose is used as the support or film base, similar strong adhesion between the film base and an emulsion layer can be obtained by coating only the gelatin layer containing the dichlorotriazine derivative without necessity of the sub-coating layer.

The present invention will be further illustrated by the following examples but it should be understood that the invention is not intended to be limited by them.

EXAMPLE 1

An emulsion (containing 15% of solid components) prepared by the emulsion copolymerization of 12 part (by weight) of n-butylacrylamide, 38 part of methyl methacrylate, and 50 part of butyl acrylate was added in ethyl alcohol to form precipitates, which were recovered, dried, and dissolved in a mixed solvent of 40 part of acetone, 50 part of methyl alcohol, and 10 part of methylene chloride. Into thus formed solution was added 2,4-dichloro-6-diethylamino-s-triazine (Compound 6) in an amount of 1/10 part by weight of the copolymer as a 2% acetone solution. The solution was coated on a support of triacetyl cellulose followed by drying at 60° C. and then a gelatin dispersion consisting of 1 part of gelatin, 2 parts of water, 2 parts of acetic acid, 85 parts of methyl alcohol, and 15 parts by weight of acetone was applied on thus formed layer followed by drying sufficiently at 90° C. When a gelatin silver-halide emulsion layer was applied on the surface and dried, strongly improved adhesion was obtained between the emulsion layer and the support, which endured any photographic treatments.

EXAMPLE 2

A 2% ethylene chloride solution of a copolymer consisting of isophthalic acid, ethylene glycol and triethylene glycol was added with a 2% acetone solution of 2,4-dichloro-6-aniline-s-triazine (Compound 11) in an amount of 1/20 part by weight of the above-mentioned ethylene chloride solution, coated on a two-dimensionally stretched polyethylene terephthalate support, and dried at 60° C. On thus formed sub-coating layer was applied a gelatin dispersion conssiting of 1 part of gelatin, 2 parts of water, 2 parts of acetic acid, 40 parts of methyl alcohol, and 60 parts by weight of acetone and the coating was dried sufficiently at 90° C. When a gelatin silver-halide emulsion was coated on the gelatin layer followed by drying, a photographic film which showed no stripping by the treatments, such as, drying and developing was obtained.

EXAMPLE 3

Instead of incorporating the dichlorotriazine derivative in the first layer (of the copolymer solution) in Example 1, a gelatin dispersion consisting of 1 part of gelatin, 1 part of salicylic acid, 1/20 part of 2,4-dichloro-6-methoxy-s-triazine (Compound 1), 2 parts of water, 20 parts of methyl alcohol, 70 parts of acetone, and 10 parts by weight of methylene chloride was applied on the first layer containing no dichlorotriazine derivative and dried sufficiently at 80° C. By applying a gelatin silver-halide emulsion on the surface, the similar results to Example 1 were obtained.

EXAMPLE 4

Into the solution consisting of 1 part of gelatin, 0.5 part of acetic acid, 30 parts of methyl alcohol, 60 parts of acetone, and 10 parts by weight of methylene chloride was added 2 parts of a 5% acetone solution of 2,4-dichloro-6-phenoxy-s-triazine (Compound 3) and thus formed gelatin dispersion was applied on a triacetyl cellulose support and dried. When a gelatin silver-halide emulsion was applied on the surface and dried, a photographic film showing no stripping by drying and developing was obtained.

EXAMPLE 5

This procedure was carried out by using the same amount of 2,4-dichloro-6-morpholino-s-triazine (Compound 7) instead of Compound 6 in Example 1, the adhesion between the emulsion and the triacetyl cellulose support in this case was almost same as in Example 1.

EXAMPLE 6

When the same amount of 2,4-dichloro-6-phenyl-hydrazino-s-triazine (Compound 15) was used instead of Compound 11 in Example 2, the adhesion between the emulsion and the polyethylene terephthalate support was almost same as in Example 2.

What is claimed is:

1. A photographic element consisting of a hydrophobic film support, a photo-sensitive emulsion layer, and at least one sub-coating layer present between the support and the emulsion layer said sub-coating layer containing a resin, and incorporated in at least one of said sub-coating layers at least one compound selected from the class consisting of the dichloro-s-triazine derivatives shown by the general formula

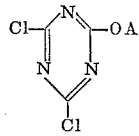

and the dichloro-s-triazine derivatives shown by the general formula

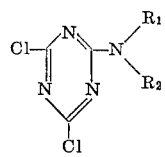

wherein A represents a member selected from the class consisting of an alkyl group, a cyclic alkyl group, an aryl group, and an aralkyl group, and $R_1$ and $R_2$ each represents a member selected from the class consisting of H, an alkyl group, a cyclic alkyl group, an aryl group, an aralkyl group, and —$NHR_3$ (where $R_3$ represents a member selected from the class consisting of an alkyl group and aryl group), provided that when $R_1$ and $R_2$ are alkyl they can be combined to form a ring containing a member selected from the class consisting of $CH_2$, O, S, and N–$R_4$ (where $R_4$ represents a lower alkyl group).

2. The photographic element according to claim 1 wherein said hydrophobic film support is triacetyl cellulose film.

3. The photographic element according to claim 1 wherein said hydrophobic film support is polyethylene terephthalate film.

4. The photographic element according to claim 1 wherein the amount of said dichloro-s-triazine derivative is ⅓ to ¹⁄₁₀₀₀ parts by weight per part by weight of resin in the sub-coating layer.

5. The photographic element according to claim 1, wherein said dichloro-s-triazine derivative is selected from the group consisting of 2,4-dichloro-6-diethylamino-s-triazine, 2,4-dichloro-6-aniline-s-triazine, 2,4-dichloro-6-methoxy-s-triazine, 2,4-dichloro - 6 - phenoxy-s-triazine, 2,4-dichloro-6-morpholino-s-triazine and 2,4-dichloro-6-phenyl-hydrazino-s-triazine.

References Cited

FOREIGN PATENTS 865,680    4/1961    Great Britain.

J. TRAVIS BROWN, *Primary Examiner.*

R. H. SMITH, *Assistant Examiner.*